Jan. 24, 1933.   J. W. MARKUS   1,895,002
DIRT SCRAPING CONVEYING TRACTOR
Filed Oct. 11, 1929
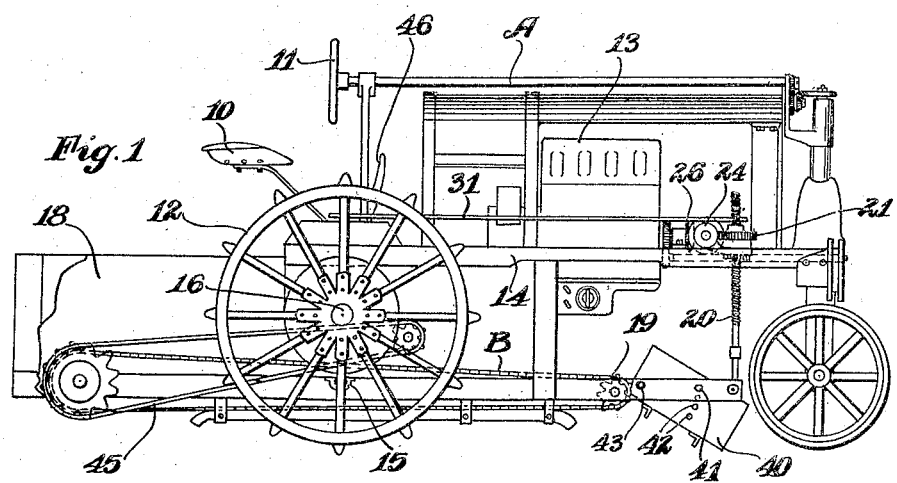
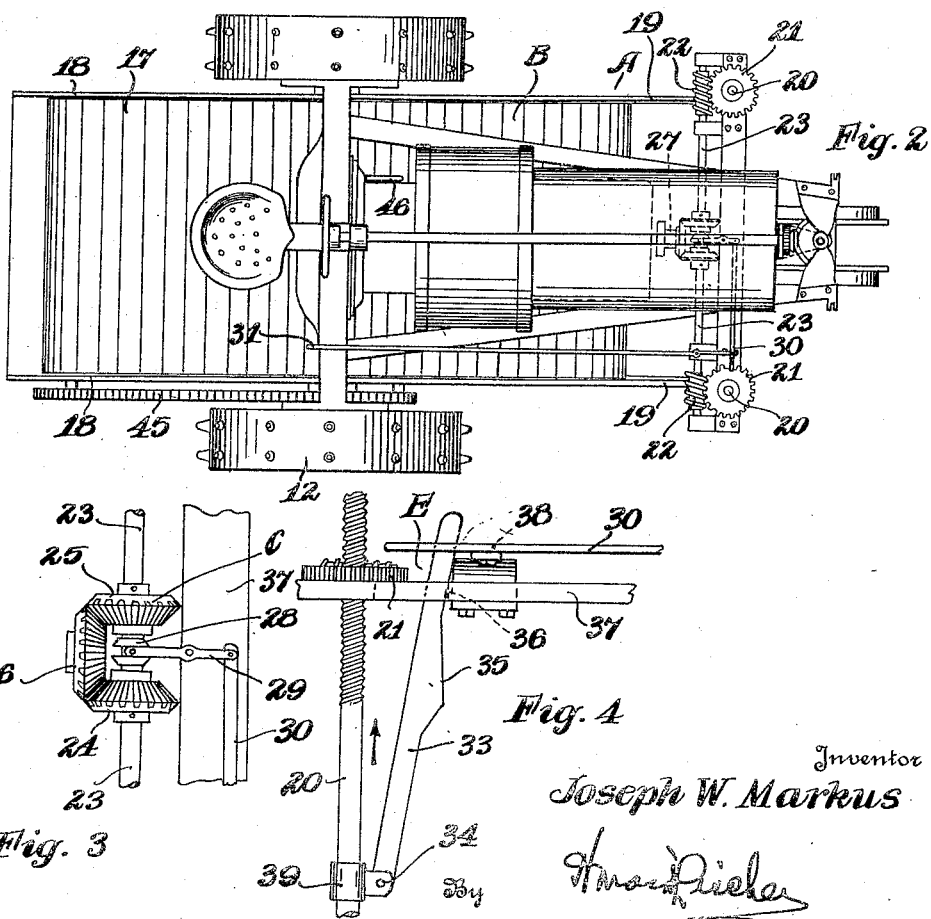
Inventor
Joseph W. Markus
By 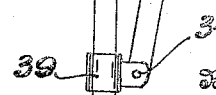
Attorney Patented Jan. 24, 1933

1,895,002

UNITED STATES PATENT OFFICE

JOSEPH W. MARKUS, OF PLAINVIEW, MINNESOTA

DIRT SCRAPING CONVEYING TRACTOR

Application filed October 11, 1929. Serial No. 398,972.

My invention relates to a dirt scraping conveying tractor which I have designed to accomplish certain features in a manner to provide tractor means which supplies the power for scraping or digging the dirt and also for operating the conveyor means for carrying the dirt on to a loading platform as it is scraped up, and then to convey the loaded dirt to a place where it is desired to dump the same, all of these features being combined in a unit simple and easy to operate.

A feature resides in a dirt conveying means which is provided with an adjustable scraper adapted to operate in conjunction with tractor means which supplies the power, the scraper being positioned forwardly and under the tractor means so as to have the advantage of the necessary weight and power for driving the scraper into the ground in operation.

My dirt scraping conveying tractor includes the loading mechanism including an endless belt loading platform upon which the dirt is received as it is scraped from the ground by the scraper and when the platform is loaded with dirt the scraper is automatically elevated. The loading platform is underhung to the tractor, being so positioned as to be balanced beneath the same to equalize the carrying load and also to permit the tractor means to operate most efficiently in getting all of the power possible out of the same in the operation of my dirt scraping conveying tractor means.

Further, my invention includes a means of automatically releasing the elevating of the scoop and front end of the conveyor. This permits the operator to throw the clutch into operation to raise the scoop and front end of the conveyor by throwing the operating clutch into operation and when the same has operated to elevate the conveyor and scoop sufficiently it is automatically stopped by releasing the operating clutch.

My scraping and conveying tractor is equally adapted for use as a conveyor for removing snow from pavements or roads, or for conveying other material where it is desired to provide a scraper which scrapes up the dirt, snow or other material on to the conveyor and afterwards carries the material to a place where it is desired to be dumped.

A primary feature resides in a means of utilizing all of the power of the tractor and conveying means in a simple and effective manner so that a powerful dirt scraper and conveying means is provided economically having a self-contained tractor means and a conveyor of a peculiar type underhung beneath the tractor means in a manner so that the operating functions and load are balanced in a very effective manner. I have found that my scraping and conveying tractor may be operated to a material advantage where it is desired to fill in soft places such as in marshy ground, for the reason that the tractor may be backed up to the soft place on the ground and then the conveying means operated to carry the filling material or dirt into the soft place or hole, and as the same is filled up the continued operation of the conveying tractor will permit the same to be backed further and further to fill up the soft or hole portions in the ground.

These features together with other details and objects of my invention will be more fully and clearly set forth in the specification and claims.

In the drawing forming part of my specification:

Figure 1 is a side view of my dirt scraping conveying tractor.

Figure 2 is a plan view of the same.

Figure 3 is a detail of a portion of the same.

Figure 4 is a portion of my machine.

My dirt scraping conveying tractor A is designed to provide tractor means of a suitable nature wherein the operator may be seated upon the seat 10 and having suitable steering means 11 together with driving wheels 12. The driving mechanism may be of the ordinary wheel type or caterpillar type to perform the traction for the tractor as may be desired.

The operating mechanism such as the engine 13 may be of ordinary type to give the desired amount of power. The engine 13 is mounted in the frame portion 14 and is connected by suitable mechanism, not illustrated in detail, so as to operate the drive wheels 12 to propel the tractor means A of my scraping conveyor. This connecting means can be of any suitable construction and formed with suitable shifting and clutch mechanism so that the tractor A can be driven forward or backward as may be desired.

My dirt scraping conveying tractor A is provided with a conveyor B which is underhung in relation to the tractor A, the side portions of which are pivotally supported at 15 virtually directly below the axle 16 of the tractor A. The conveyor B is formed with an endless belt loading platform 17 made up of a suitable slatted structure so as to form a platform or loading table 17 upon which dirt, snow or other material may be loaded.

The conveyor B is formed with suitable side walls 18 and is provided with forwardly projecting supporting arms 19 which are carried by the adjusting rods 20 and which is adapted to be operated by these rods in a manner so as to raise and lower the same when it is desired. The rods 20 are adapted to be operated by the gears 21 at either side of the front end of the conveyor B owing to the screw threaded connection between the gears 21 and the rods 20, so that when the gears 21 are operated the rods 20 will be raised or lowered as the case may be. Extending transversely in the frame 14 of the tractor A, I provide a shaft 23 which carries the driving gears 22 which mesh with the gears 21. Thus when the shaft 23 is operated the gears 21 will be operated and accordingly will operate the rods 20.

Virtually centrally between the ends of the shaft 23 I provide a clutch mechanism C which includes the gears 24 and 25 carried by the shaft 23 and the gear 26 which is interposed between the gears 24 and 25 and which is operated by the drive shaft 27 of the engine 13 of the tractor A. The gears 24 and 25 are freely disposed on the shaft 23 and are held in mesh with the driving gear 26. Between the gears 24 and 25 I provide a clutch member 28 which is splined to the shaft 23 and which is adapted to be operated by the levers 29 and 30, and the hand lever 31 which extends with its free end back to a point adjacent the operator's seat 10. By operating the lever 31 the clutch 28 may be shifted to engage either the gear 24 or 25.

When the lever 31 is operated to shift the clutch mechanism C so that the clutch member 28 will engage with the gear 24 and the engine 13 is operating, the shaft 23 will be operated to operate the shafts 20 to cause the front end of the conveyor B to be lowered toward the ground. When the clutch member 28 is shifted to the neutral position, the shaft 23 will be stopped while the gears 24 and 25 idle on the shaft 23. However, when the clutch member 28 is shifted into engagement with the gear 25, then the shaft 23 will operate the front end of the conveyor B through the arms 19 to raise the front end of the conveyor away from the ground up under the front end of the tractor A.

I provide an automatic release E connected to one of the shafts 20 which is formed with an operating arm 33 pivoted at 34 to the shaft or rod 20 and formed with a cam surface 35 which extends through a slot 36 in the brace member 37. The brace member 37 is positioned to extend transversely across the front of the tractor frame 14 below the gears 21 and along which the operating lever 30 extends. This brace 37 also pivotally supports the operating arm 29 of the clutch mechanism. The lever 33 is connected to the operating lever 30 by extending through a suitable slot 38 in the lever 30. Thus when the rod 20 illustrated in Figure 4 is operated to raise the same in the direction of the arrow by the operation of the gear 21, the lever 30 will be shifted sufficiently to operate the clutch C into neutral position when the front end of the conveyor B has been elevated the desired distance from the ground. The operation of the release E may be regulated by adjusting the collar 39 which pivotally supports the operating arm 33 at 34 to the shaft or rod 20. Thus the releasing of the clutch C may be set to take place at the desired time so that the front end of the conveyor and dirt receiver B may be raised the desired amount before the clutch C is disengaged automatically by the raising operation. The front end of the conveyor B carries between the arms 19 a dirt scraping plow 40 which may be adjustably connected by the pins 41 positioned in suitable holes 42 in the sides of the plow 40 and by reason of the pivotal connection 43 of the rear end of the plow to the arms 19 of the conveyor B. The plow 40 is of a width to extend between the arms 19 and is positioned so as to plow the dirt from the ground up on to the front end of the conveyor B, in the forward operation of the tractor A. The rods 20 raise or lower the plow or scraper 40 to give the desired operation to the same and by this adjustment a shallower or deeper scraping operation may be accomplished by the scraper 40.

In operating my dirt scraping conveying tractor, after the scraper 40 has scraped the desired amount of dirt on to the conveyor B, it is only necessary for the operator to shift the lever 31 to operate the clutch C to raise the scraper 40 by the rods 20. Then by my automatic release E the raising operation will be automatically stopped at the desired moment.

The endless belt or loading platform 17 of the conveyor B is adapted to be operated by a suitable drive chain 45 which is brought into operation by the operating lever 46 and suitable clutch mechanism, not illustrated, so that while my dirt scraping conveyor tractor is in operation to plow the dirt up by the scraper 40 on to the conveyor platform 17, the platform may be operated in a backward direction toward the rear end of the platform B carrying the dirt which is plowed up on to the same toward the back of the conveyor B and when the desired amount of dirt is loaded up on to the platform 17 of the conveyor, the operating lever 46 will stop the movement of the platform 17 and the operator of my scraping conveyor will then operate the lever 31 to raise the front end of the conveyor B, and driving the scraping conveyor tractor A to a place where it is desired to dump the dirt from the conveyor B. The operator of the scraping conveyor tractor then operates the lever 46 to dump the dirt carried on the platform 17 out of the rear end of the same and it is thus apparent that the load of the scraping conveyor tractor may be readily dumped into a hole or on to swampy ground and at the same time of dumping, the tractor A may be driven forward or backward to spread the dirt dumped from the same.

My dirt scraping conveying tractor is equally adapted to operate for handling snow to scrape the same off of the pavements or road and then dumping it where it may be desired. It will be apparent and readily appreciated that the operation of my scraping conveyor tractor is of a simple nature, being so constructed as to obtain all of the operating forces of the tractor mechanism A and increasing the digging and scraping forces by means of loading the dirt on to the lower underhung endless receiving platform 17 which operates to automatically load itself and also to unload. The low hanging of the receiving platform 17 is an advantage because it is not necessary to raise the dirt very high off of the ground from which it is scraped, and the positioning of the conveyor B in a manner as described gives me all of the advantages of utilizing the forces of the tractor A in a very desirable and practical manner.

I have found my dirt scraping conveying tractor to be of a very useful nature, accomplishing results in a better way and not only easier than with other devices, but more economical in its general operation in handling of dirt or other material which it is desired to move from one place to another. My scraping conveying tractor may be adapted for various uses accomplishing results in an economical and practical manner.

In accordance with the patent statutes I have described the principles of operation of my scraping conveying tractor and while I have endeavored to illustrate the best embodiment thereof in my drawing and specification, I desire to have it understood that the same is only suggestive and that variations may be made and other uses applied within the scope of the following claims without departing from the purpose and intent of my invention.

I claim:

1. A tractor conveyor comprising, power means, an endless conveyor, a scraping plough adjacent one end of said conveyor, means for adjustably supporting the plough end of said conveyor, means for transmitting power from said power means to said supporting means to raise and lower the same, a clutch interposed in said power transmitting means, a lever for manually operating said clutch, a cam means on said supporting means for automatically moving said lever to disengage said clutch when a predetermined height of said plough end of the conveyor is reached.

2. A tractor conveyor comprising, power means, an endless conveyor, means for adjustably supporting one end of said conveyor, means for transmitting power to raise and lower the same, a clutch interposed in said power transmitting means, a lever for manually operating said clutch, a slot in said lever, an arm pivotally connected to said supporting means extending through said slot, and a cam surface on said arm to move said lever to disengage said clutch when said end of said conveyor reaches a predetermined height.

3. A tractor conveyor including, power means, an endless conveyor, means for adjustably supporting one end of said conveyor, clutch means for engaging said power means to raise and lower said adjustable supporting means, a frame for supporting said supporting means and power means, a lever for operating said clutch, an arm pivoted to said supporting means and extending through said frame and lever, and a cam surface on said arm engageable with said frame to move said clutch operating lever, when said supporting means has raised said conveyor end to a predetermined height.

4. A tractor conveyor including, a tractor, a rear axle thereupon, an underslung body portion pivoted beneath said rear axle, a conveyor bottom in said underslung body, a scoop on the forward end of said body portion directly behind the front wheels of the tractor, and means for raising and lowering the forward end of said body portion.

5. A tractor conveyor including, a tractor, a rear axle thereupon, an underslung body portion, a conveyor bottom in said body portion, and means for pivoting said body portion midway the ends thereof below said rear axle.

6. A tractor conveyor including, a tractor, an underslung body, a conveyor bottom on said body, a scoop at one end of said body, means for pivotally mounting said body to said tractor midway between the ends of said body, and means for raising or lowering one end of the body.

7. A tractor conveyor comprising a superimposed frame, traction wheels for supporting one end of said frame, guiding wheels for supporting the other end, means for driving said traction wheels, an underslung frame supported between said traction wheels to extend approximately equidistant in front of and in back of said traction wheels, an endless conveyor supported by said underslung frame, means for pivotally supporting said underslung frame to permit one end thereof to be raised and lowered, a scoop plow associated with the forward end of said conveyor to carry earth up onto said conveyor when said tractor conveyor moves in one direction, and means for driving said conveyor from said driving means for said traction wheels.

8. A tractor conveyor comprising, a tractor frame and self propelling means including traction wheels, an underslung frame pivotally mounted beneath the axle of said traction wheels, a conveyor carried by said underslung frame extending virtually equidistant on either side of said axle to the front and to the rear of said tractor conveyor having an open front and rear end for receiving and dumping earth, plow means for elevating earth to said conveyor, and means for raising and lowering said plow and adjacent end of said conveyor simultaneously.

9. A tractor conveyor comprising, a tractor having a pair of traction wheels on one end, guiding wheels on the other end, an underslung conveyor frame and endless conveyor pivotally supported beneath the axle of said traction wheels, a scoop for lifting earth to said conveyor, and means for driving said conveyor from said tractor.

JOSEPH W. MARKUS.